United States Patent
Pontes Bittencourt

(10) Patent No.: US 11,794,168 B2
(45) Date of Patent: Oct. 24, 2023

(54) PROCESS FOR PREPARING A PRE-REFORMING CATALYST HAVING RESISTANCE TO DEACTIVATION BY PASSAGE OF STEAM IN THE ABSENCE OF A REDUCING AGENT, AND A PRE-REFORMING CATALYST

(71) Applicant: PETRÓLEO BRASILEIRO S. A.—PETROBRAS, Rio de Janeiro (BR)

(72) Inventor: Roberto Carlos Pontes Bittencourt, Rio de Janeiro (BR)

(73) Assignee: PETRÓLEO BRASILEIRO S.A.—PETROBRAS, Rio de Janeiro (BR)

( * ) Notice: Subject to any disclaimer, the term of this patent is extended or adjusted under 35 U.S.C. 154(b) by 501 days.

(21) Appl. No.: 16/754,117

(22) PCT Filed: Sep. 28, 2018

(86) PCT No.: PCT/GB2018/052781
§ 371 (c)(1),
(2) Date: Apr. 6, 2020

(87) PCT Pub. No.: WO2019/069058
PCT Pub. Date: Apr. 11, 2019

(65) Prior Publication Data
US 2020/0290021 A1    Sep. 17, 2020

(30) Foreign Application Priority Data
Oct. 5, 2017 (BR) ............ 10 2017 021428-1

(51) Int. Cl.
| | | |
|---|---|---|
| *B01J 23/50* | (2006.01) | |
| *B01J 21/04* | (2006.01) | |
| *B01J 23/04* | (2006.01) | |
| *B01J 23/46* | (2006.01) | |
| *B01J 35/10* | (2006.01) | |
| *B01J 37/02* | (2006.01) | |
| *B01J 37/16* | (2006.01) | |
| *B01J 37/18* | (2006.01) | |
| *C01B 3/40* | (2006.01) | |

(52) U.S. Cl.
CPC ............ *B01J 23/50* (2013.01); *B01J 21/04* (2013.01); *B01J 23/04* (2013.01); *B01J 23/462* (2013.01); *B01J 35/1014* (2013.01); *B01J 35/1019* (2013.01); *B01J 37/0213* (2013.01); *B01J 37/0236* (2013.01); *B01J 37/16* (2013.01); *B01J 37/18* (2013.01); *C01B 3/40* (2013.01); *C01B 2203/0233* (2013.01); *C01B 2203/1064* (2013.01); *C01B 2203/1082* (2013.01); *C01B 2203/1241* (2013.01)

(58) Field of Classification Search
CPC ... B01J 23/50; B01J 21/04; B01J 23/04; B01J 23/462; B01J 35/1014; B01J 35/1019; B01J 37/0213; B01J 37/0236; B01J 37/16; B01J 37/18; C01B 3/40; C01B 2203/0233; C01B 2203/1064; C01B 2203/1082; C01B 2203/1241
USPC ........................................................ 252/373
See application file for complete search history.

(56) References Cited

U.S. PATENT DOCUMENTS

| | | | |
|---|---|---|---|
| 5,268,346 A | 12/1993 | Ino | |
| 6,409,939 B1* | 6/2002 | Abdo | ............ C01B 3/583 252/373 |
| 6,429,167 B1 | 8/2002 | Maeno et al. | |
| 7,037,485 B1* | 5/2006 | Drnevich | ............ C01B 17/0408 423/652 |
| 2005/0221977 A1* | 10/2005 | Fukunaga | ............ B01J 37/0205 502/324 |
| 2007/0078289 A1 | 4/2007 | Xu | |
| 2015/0315019 A1 | 11/2015 | Bittencourt | |

FOREIGN PATENT DOCUMENTS

| | | | |
|---|---|---|---|
| CA | 2593413 A1 | | 12/2008 |
| JP | S5681392 A | | 7/1981 |
| JP | 2005185989 A | | 7/2005 |
| JP | 2011167595 A | | 9/2011 |
| WO | WO2004/058634 | * | 7/2004 |
| WO | 2016083020 A1 | | 6/2016 |
| WO | WO 2016/166526 | * | 10/2016 |

OTHER PUBLICATIONS

Machine translation of JP2005185989 downloaded Jul. 14, 2022, pp. 1-16 (Year: 2022).*
International Search Report and Written Opinion corresponding to PCT/GB2018/052781 dated Dec. 17, 2018.

* cited by examiner

*Primary Examiner* — Douglas B Call
(74) *Attorney, Agent, or Firm* — ARENTFOX SCHIFF LLP

(57) ABSTRACT

The present invention relates to a process for preparing a pre-reforming catalyst having resistance to deactivation by passage of steam in the absence of a reducing agent comprising ruthenium and an alumina support. Furthermore, the Ru/alumina catalyst according to the present invention becomes much more resistant to deposition of coke with the addition of Ag.

11 Claims, No Drawings

PROCESS FOR PREPARING A PRE-REFORMING CATALYST HAVING RESISTANCE TO DEACTIVATION BY PASSAGE OF STEAM IN THE ABSENCE OF A REDUCING AGENT, AND A PRE-REFORMING CATALYST

This application is a U.S. National Stage entry under 35 U.S.C. § 371 based on International Application PCT/GB2018/052781, filed on Sep. 28, 2018, which claims the benefit of priority to BR 10 2017 021428-1, filed Oct. 5, 2017 which is incorporated herein by reference in its entirety.

FIELD OF THE INVENTION

The present invention relates to a process for preparing a pre-reforming catalyst comprising ruthenium having resistance to deactivation by passage of steam in the absence of a reducing agent and to the pre-reforming catalyst thus obtained. The invention further relates to a pre-reforming process carried out in the presence of the pre-reforming catalyst.

BACKGROUND OF THE INVENTION

Hydrogen is a promising energy source owing to the high calorific value provided, besides being a product causing practically no pollution of the environment.

Hydrogen or hydrogen-rich gases, called synthesis gases, are produced on a large scale for use in the refining industry in processes for hydrofining of streams derived from petroleum, such as gasoline or diesel, so that their quality meets the current standards of environmental legislation. Hydrogen is also widely used industrially for producing synthetic fuels (GTL), methanol, ammonia, urea and other widely used products.

There are various industrial processes for converting natural gas and other hydrocarbons to synthesis gas, but steam reforming is the main process for producing hydrogen on an industrial scale. The main reactions taking place in the steam reforming process are presented below:

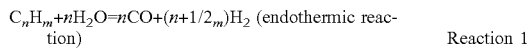
$C_nH_m + nH_2O = nCO + (n + 1/2 m)H_2$ (endothermic reaction)    Reaction 1

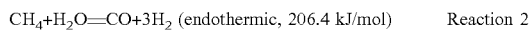
$CH_4 + H_2O = CO + 3H_2$ (endothermic, 206.4 kJ/mol)    Reaction 2

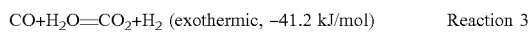
$CO + H_2O = CO_2 + H_2$ (exothermic, −41.2 kJ/mol)    Reaction 3

The steam reforming process is usually carried out by introducing the hydrocarbon feed, selected from natural gas, refinery gas, liquefied petroleum gas, propane, butane or naphtha, purified beforehand by removing sulphur compounds, chlorides, heavy metals and/or olefins, and steam in excess relative to stoichiometry (reactions 1, 2 and 3) in a variable number of reactors that consist of metal tubes, with typical dimensions from 7 to 15 cm outside diameter and height between 10 and 13 m, containing catalysts. These tubes are located inside a furnace, which supplies the heat necessary for the reactions. The assembly consisting of reactors and heating furnace is called a primary reformer.

However, although reforming of hydrocarbons is the most used and most viable process compared to the other processes, it is still an expensive method for producing hydrogen. Owing to the need for the energy efficiency of the process to be increased, pre-reforming is a possible alternative. This process consists of converting longer-chain hydrocarbons to methane, such as the ethane present in natural gas, propane and butane present in GLP or such as hydrocarbons of the range from pentanes to heptanes present in naphtha.

Specifically, steam pre-reforming refers to the reaction of hydrocarbons, typically with the general formula $C_xH_y$, with maximum boiling point around 240° C., and which may contain oxygen atoms in their composition, with steam for producing hydrogen. The pre-reforming process differs from the steam reforming process by the temperature range used and by the methane content in the gases produced. Pre-reforming is carried out at temperatures between 400 and 550° C. and produces a gas with a methane content typically above 20%, whereas steam reforming is carried out at temperatures between 550° C. and 950° C. and produces a gas with a methane content typically less than 5%.

However, the main problem in the generation of hydrogen or synthesis gas relates to the catalyst employed. Among other requirements, the catalyst must be efficient, must possess reasonable stability for a long period of time, and must be resistant to carbon deposits and to the temperature.

A catalyst suitable for carrying out the reaction of steam reforming will not generally have good performance for carrying out the pre-reforming reaction, and vice versa, since a catalyst suitable for industrial use must be designed for a specified reaction and for a specified set of process conditions.

Therefore appropriate selection of the catalyst has direct effects on the costs of the process. Accordingly, the use of more efficient catalytic systems and/or optimization of their performance in conventional processes are becoming of fundamental importance.

The pre-reforming catalysts are produced industrially in the form of nickel oxide. For them to become active in the pre-reforming reaction, it is necessary to carry out a reduction process, in which typically $H_2$ or gases rich in $H_2$ are passed over the catalyst at temperatures that are increased gradually from 400 to 800° C. As these conditions are not reached in the industrial pre-reforming reactors, so-called pre-reduced catalysts, which have been submitted to this process externally, are commonly marketed. These catalysts present difficulties in handling owing to their characteristic of being pyrophoric when exposed to air.

Once in operation, care must be taken to avoid oxidation of the catalyst (the inverse process of reduction), as this will require temperatures above those that can be reached in the industrial units for them to be reduced again. This occurs when there is passage of steam and absence of reducing agent over the pre-reforming catalyst in operation.

Thus, a limitation of the present technology of pre-reforming catalysts based on nickel is resistance to the passage of steam in the absence of a reducing agent, which may be hydrogen, methanol, natural gas or other hydrocarbons. This limitation follows from the known fact that the passage of steam under the nickel-based pre-reforming catalyst in typical conditions of the steam pre-reforming process leads to permanent loss of its activity. This limitation of the pre-reforming catalysts has various negative consequences from the standpoint of the process for hydrogen production by steam pre-reforming, such as:

Immediate stoppage of the unit when the hydrocarbon feed fails. Typically, with the use of interlock logic circuits that lead to by-pass of the reactor and that require expensive valves with automatic operation or the use of rapid depressurization of the unit with risks to the catalysts and to the equipment.

Immediate stoppage of the unit in the case of failure of the recycle hydrogen fed to the inlet of the reactor to guarantee a reducing atmosphere, thus reducing the reliability of the process as a whole. Optionally, it may require expensive strategies for maintaining and using stored hydrogen or methanol for supply in emergency situations.

Impossibility of steam heating of the pre-reforming reactors and of the downstream reactors, such as for primary reforming, during the procedures for start-up of the unit, leading to more complex logic circuits with greater risk to the integrity of the equipment, especially of the primary reformer due to thermal shock.

Some documents of the prior art teach catalysts for hydrogen production, such as those that are mentioned below.

The patent publication WO 2016/083020A1 teaches a method for preparing a catalyst by impregnating ruthenium on an alumina support and drying the product between 60 and 200° C.

The document claims a method of preparation that is characterized in that it includes a step of steam treatment between 110 and 195° C., for between 30 min and 4 h in the presence of a mixture of air and steam, with a content of steam between 2 and 50 vol %.

It should be pointed out that this document applies to Fischer-Tropsch synthesis, i.e. to conversion of CO with $H_2$ to hydrocarbons.

The U.S. Pat. No. 6,429,167B1 D2 discloses a catalyst that includes at least one ruthenium component supported by a porous alumina material. The catalyst of the Ru type on alumina comprises a porous support of the α-alumina type, with a specific surface area from 7 to 50 $m^2/g$ for use in reactions of steam reforming of hydrocarbons. The process for preparing this catalyst comprises a drying step typically carried out at temperatures varying from 50 to 150° C., for one hour or more, and a subsequent step of calcination in air or in an air stream for 1 to 24 h at 400° C. to 800° C.

As mentioned above, a catalyst is specific to a specified reaction and operating conditions. Thus, in the conditions of pre-reforming of hydrocarbons, the temperature is of the order of 400 to 550° C., preferably from 430 to 490° C. In these conditions, when the catalysts based on Ni are exposed to steam they are oxidized and cannot be reduced again in the operating conditions. In its turn, the same catalyst based on Ni used in a reaction of steam reforming can be exposed to passage of steam for long periods, since, owing to the high temperature of this process (between 550° C. at reactor inlet and 850° C. at reactor outlet), the Ni species, whether they are oxides, hydroxides or aluminium compounds that may be formed when exposed to steam, can be reduced again to metallic Ni, which is the active phase of the catalyst. Furthermore, owing to the lower temperature of the pre-reforming reaction, it would not be advisable to use a support of the α-alumina type, since it has a low surface area.

Thus, it is highly desirable to develop catalysts for steam pre-reforming with high activity and that are resistant to the passage of steam in the absence of a reducing agent, allowing the unit to be maintained in the heated and pressurized condition, making a quicker return to operation possible and minimizing the risks associated with sudden changes of temperature and pressure in the unit.

As will be described in more detail below, the present invention provides a solution to the problems of the prior art described above in a practical and efficient manner.

SUMMARY OF THE INVENTION

The present invention relates to a process for preparing a pre-reforming catalyst comprising ruthenium and having resistance to deactivation by passage of steam in the absence of a reducing agent. In addition, the present invention relates to said catalyst in a steam pre-reforming process.

Furthermore, the catalyst comprising ruthenium according to the present invention displays greater resistance to the deposition of coke with the addition of a certain silver content.

The present invention relates to a process for preparing a pre-reforming catalyst having resistance to deactivation by passage of steam in the absence of a reducing agent, characterized in that it comprises the steps of:

preparing a solution, preferably aqueous, of an inorganic Ru salt;

impregnating a theta-alumina support with the solution of the inorganic Ru salt to provide an impregnated material;

drying the impregnated material in air at a temperature varying between 30° C. and 200° C. for 1 to 24 hours.

The present invention further provides a pre-reforming catalyst prepared by the process of the invention, and characterized in that it comprises Ru between 0.1 and 1.0 wt % deposited on a support of the theta-alumina type, based upon the weight of the catalyst.

The present invention yet further provides a pre-reforming process comprising a step in which hydrocarbons are reacted with steam to produce a product stream comprising hydrogen, wherein the process is carried out at temperatures between 400 and 550° C., wherein the product stream has a methane content above 20 wt %, based upon the weight of the product stream, and characterised in that the pre-reforming is carried out in the presence of a catalyst obtainable by a process of the invention.

DETAILED DESCRIPTION OF THE INVENTION

The present invention relates to a process for preparing a catalyst comprising ruthenium endowed with resistance to deactivation by passage of steam in the absence of a reducing agent for use in a steam pre-reforming process.

Usually, in the commercial nickel-based pre-reforming catalysts, when exposed to the presence of steam and absence of a reducing agent, the nickel phase is oxidized, so that they cannot be reduced again, and they become active in the temperature conditions of the pre-reforming reaction.

The support of the claimed catalyst is alumina. Alumina is a solid containing atoms of Al and O. However, depending on the crystalline structure, there may be various types of alumina, such as gamma, alpha, theta, among others. The alumina of the alpha type has a low surface area and higher temperature resistance, and is used as a support for steam reforming catalysts. The present invention uses theta-alumina, which has a larger surface area, giving a higher activity potential, and sufficient heat resistance for use in conditions of pre-reforming. The theta-alumina support may contain up to 10% of calcium aluminate, magnesium aluminate or other refractory cements for greater mechanical strength. The particles of the support may be of various shapes suitable for industrial use in the steam pre-reforming process, such as spheres, cylinders or cylinders with a central hole (Raschig rings).

The pre-reforming catalyst with high resistance to deactivation by passage of steam in the absence of a reducing agent and by deposition of coke of the present invention comprises Ru between 0.1 and 1.0 wt % deposited on a support of the theta-alumina type. Preferably, the Ru content varies between 0.1 and 0.5 wt %.

Furthermore, the total surface area of the catalyst is from 60 m$^2$/g to 500 m$^2$/g. Preferably, the total surface area varies from 60 m$^2$/g to 120 m$^2$/g.

Moreover, the catalyst may be impregnated with silver, so as to increase the resistance to the deposition of carbon. In this case, an Ag content between 0.1 and 1 wt %, preferably between 0.1 and 0.5 wt %, is added to the Ru/alumina catalyst.

The claimed catalyst may be exposed to passage of steam in the absence of a reducing agent for a minimum period of 24 h at temperatures between 400 and 550° C. without loss of pre-reforming activity.

The process for preparing the pre-reforming catalyst of the present invention involves the following steps:

preparation of an aqueous solution of an inorganic Ru salt;

impregnation of a theta-alumina support in the granulometric range from 100 to 200 mesh (equivalent to 0.075 mm to 0.150 mm), preferably from 100 to 150 mesh (equivalent to 0.105 mm to 0.150 mm);

drying the impregnated material containing Ru in air at a temperature varying between 30 and 200° C., preferably between 50° C. and 150° C. for 1 to 24 hours.

The inorganic Ru salt is preferably water-soluble, such as hydrated ruthenium chloride [RuCl$_3$.xH$_2$O]; aqueous solution of ruthenium nitrosyl nitrate [Ru(NO)(NO$_3$)$_3$]. It is also possible to use ruthenium salts that are soluble in organic solvents, such as ruthenium (III) acetylacetonate [Ru(C$_5$H$_7$O$_2$)$_3$].

Furthermore, impregnation of the support may be effected by the pore volume technique (wet point) or by the excess solution method.

If the catalyst is impregnated with Ag to increase the resistance to deposition of carbon, the aqueous solution used in catalyst preparation additionally comprises a solution containing Ag, preferably AgNO$_3$.

The catalyst prepared on the basis of the present process is active, stable and ready for use, and does not have to undergo calcination in air, otherwise it would lose its properties of reduction and of activity at temperatures typical of the pre-reforming reactor, which are between 400° C. and 550° C. Absence of the calcination step brings clear benefits of reduction of the cost of production.

The catalyst thus prepared may also be reduced beforehand in a stream of a reducing agent, selected from hydrogen, formaldehyde and methanol in temperature conditions between 300 and 500° C., for 1 to 5 h, and then cooled and subjected to an air stream at temperatures between 20 and 60° C., for 1 to 5 h, to avoid the material having a pyrophoric character during handling.

Preferably, the catalyst of the present invention is prepared from the inorganic oxide support, preferably by the method of incipient wetness impregnation. In this method, the support is brought into contact with a volume of solution, preferably aqueous, of the nickel, lanthanum and cerium salts, sufficient to fill the pores of the support completely. Preferably, the solvent of the impregnation solution is water, alcohols, such as methanol or ethanol, or combinations thereof.

Alternatively, the support may have a content between 0.1 and 10 wt %, preferably between 1 and 5 wt % of alkali metals. The alkali metal, preferably potassium, may be introduced into the support beforehand or during the steps of impregnation with the solution of nickel salt.

Examples illustrating various embodiments of the present invention, but without limiting its content, are presented below.

COMPARATIVE EXAMPLE

This example illustrates the preparation of a commercial catalyst as known in the prior art.

The commercial pre-reforming catalyst has an Ni content between 40 and 60% (w/w) and is supplied in the pre-reduced state.

EXAMPLES

The following examples 1 to 5 illustrate the preparation of steam pre-reforming catalysts by the process of the present invention.

Example 1

This example illustrates the preparation of a pre-reforming catalyst according to the present invention. Forty grams of a theta-alumina (Axens SPH 508F), ground beforehand in the granulometric range from 100 to 150 mesh, were impregnated by the pore volume technique with 28 ml of an aqueous solution containing 0.9 g of RuCl$_3$.xH$_2$O. The material was dried at a temperature between 90 and 120° C. for 12 h, giving a pre-reforming catalyst of the Ru/theta-alumina type containing 1 wt % of Ru and with a specific surface area determined by the N$_2$ adsorption method of 62 m$^2$/g.

Example 2

This example illustrates the preparation of a pre-reforming catalyst according to the present invention. Thirty grams of a theta-alumina (Axens SPH 508F), ground beforehand in the granulometric range from 100 to 150 mesh, were impregnated by the pore volume technique with 21 ml of an aqueous solution containing 0.68 g of RuCl$_3$.xH$_2$O and 0.15 g of AgNO$_3$. The material was dried at a temperature between 90 and 120° C. for 12 h, giving a pre-reforming catalyst of the AgRu/theta-alumina type containing 1 wt % of Ru and 0.30 wt % of Ag and having a specific surface area determined by the N$_2$ adsorption method of 58 m$^2$/g.

Example 3

This example illustrates the method of accelerated deactivation to which the pre-reforming catalysts were subjected by passage of steam (steaming) in the absence of a reducing agent.

Two grams of the materials described in the Comparative Example and in Examples 1 and 2 were loaded in a steel reactor in a catalyst testing unit. The catalyst was heated in a stream of 600 ml/min of H$_2$ and at a rate of 10°/min from room temperature to 450°, which was maintained for 2 h. Then the H$_2$ was replaced with N$_2$ and the unit was purged for 1 h, and then steam was supplied. These conditions of steaming at 450° C. were maintained for periods of time between 2 and 40 h at a pressure of 20 atm.

Example 4

This example illustrates the excellent resistance of the catalysts according to the present invention to deactivation by passage of steam in the absence of a reducing agent.

The initial steam reforming activity was determined in AutoChem II commercial equipment (Micromeritics). The tests were carried out using 500 mg of ground catalyst in the range between 100 and 150 mesh. The experiments were carried out at atmospheric pressure and at temperatures of 450° C., 500° C. and 550° C. by the passage of 50 ml of a stream containing 50% v/v of methane, 5% of $H_2$ and 45% of argon saturated with steam at 90° C. The effluent gases from the reactor were analysed by gas chromatography and the activity was measured by the degree of conversion of the methane.

Table 1 presents results for catalytic activity, expressed as conversion of methane, of the materials described in the Comparative Example and in Examples 1 and 2 before and after undergoing the process of accelerated deactivation due to the absence of reducing agents (steaming), as described in Example 3.

TABLE 1

Results for catalytic activity of the catalysts prepared by the Comparative Example and Examples 1 and 2.

| Catalyst | Deactivation time (h) | Methane conversion at 450° C. (% v/v) |
|---|---|---|
| Comparative Example | 0 | 15.4 |
|  | 24 | 0 |
| Example 1 | 0 | 21.3 |
|  | 24 | 24.2 |
| Example 2 | 0 | 11.3 |
|  | 24 | 11.2 |

The results show that the catalysts according to the present invention are not deactivated by steaming in the absence of an agent, even after 24 hours of exposure. In its turn, the commercial catalyst was completely deactivated in the same conditions.

Example 5

This example illustrates the excellent resistance of the catalysts according to the present invention to deactivation by deposition of coke.

The catalysts underwent comparative tests in equipment for thermogravimetric analysis (TGA Mettler Toledo) TGA/SDTA851E. The tests were carried out using 25 mg of ground catalyst in a range below 170 mesh. Initially, a pre-treatment step was performed by passage of 40 ml/min of a mixture containing 10% (v/v) of hydrogen in argon saturated with steam at 15° C. together with 40 ml/min of nitrogen (shielding gas) with programming of temperature varying from 100° C. to 650° C. at a rate of 10° C./min, maintained for 1 h. Next, the temperature was reduced to 350° C. and the measurements of the rates of coke formation were performed, by replacing the stream of $H_2$/argon with a synthetic stream consisting of 21.9% hydrogen, 13.2% of CO, 15.9% of $CO_2$, 43.62% of $CH_4$, 1.77% of nitrogen and 0.20% of ethylene saturated with steam at 15° C. with temperature programming from 350° C. to 700° C. at a rate of 5° C./min. The results for carbon deposition are presented in Table 2 as the weight increase due to deposition of coke at the end of the experiment.

TABLE 2

Content of coke deposited on the catalyst prepared according to the Comparative Example and Examples 1 and 2.

| Catalyst | Content of coke deposited by weight (% w/w) |
|---|---|
| Comparative Example | 200 |
| Example 1 | 0.2 |
| Example 2 | 0 |

It can be seen from Table 2 that the weight of the catalyst of the prior art increased by 200% due to the coke deposited. In contrast, the Ru/theta-alumina catalyst has a slight increase in weight due to coke, and the RuAg/theta-alumina catalyst does not have coke deposits.

Numerous variations falling within the scope of protection of the present application are permitted. This reinforces the fact that the present invention is not limited to the particular configurations/embodiments described above.

It can therefore be concluded, surprisingly, that the catalyst of the present invention with Ru contents below 1% w/w displays high resistance to loss of activity when exposed to periods of steaming and absence of reducing agent in conditions of temperature and pressure used in the pre-reforming step, allowing the industrial unit to be maintained in the heated and pressurized condition and minimizing the risks associated with sudden changes of temperature and pressure in the unit.

Furthermore, the Ru/alumina catalyst according to the present invention is even more resistant to deposition of coke with addition of a preferred content of Ag between 0.1 and 0.5% w/w than the commercial catalyst taken as a reference, which makes the pre-reforming process more robust and less subject to operational problems.

The invention claimed is:

1. A process for preparing a pre-reforming catalyst comprising:
   preparing a solution comprising an inorganic ruthenium (Ru) salt and silver nitrate ($AgNO_3$);
   impregnating a theta-alumina support with the solution to provide an impregnated material;
   drying the impregnated material in air at a temperature between 30 and 200° C. for 1 to 24 hours,
   wherein
   the theta-alumina support is impregnated by a pore volume technique or by the excess solution method using an incipient wetness impregnation method; and
   the pre-reforming catalyst has resistance to deactivation by passage of steam in the absence of a reducing agent.

2. The process according to claim 1, wherein the inorganic Ru salt is hydrated ruthenium chloride $RuCl_3·H_2O$.

3. The process according to claim 1, wherein the theta-alumina support additionally comprises between 0.1 and 10 percent by weight (wt %) of alkali metal, based upon the weight of the theta-alumina support.

4. The process according to claim 3, wherein the alkali metal is potassium.

5. The process according to claim 1, further comprising:
   taking a material that results from the drying of the impregnated material and reducing said material in a stream of a reducing agent, selected from hydrogen, formaldehyde and methanol, in temperature conditions between 300 and 500° C., for 1 to 5 hours to provide a reduced material; and cooling the reduced material and subjecting the reduced material to an air stream at temperatures between 20 and 60° C., for 1 to 5 hours.

6. A pre-reforming process comprising:
reacting hydrocarbons with steam at temperatures between 400 and 550° C. to produce a product stream comprising hydrogen and having a methane content above 20 percent by weight (wt %), based upon the weight of the product stream, wherein
the pre-reforming is carried out in the presence of a catalyst obtainable by a process according to claim 1.

7. The pre-reforming process according to claim 6, wherein the hydrocarbons are reacted with the steam at temperatures between 430 and 490° C.

8. A pre-reforming catalyst prepared by the process comprising:
preparing a solution comprising an inorganic ruthenium (Ru) salt and silver nitrate ($AgNO_3$);
impregnating a theta-alumina support with the solution to provide an impregnated material; and
drying the impregnated material in air at a temperature between 30 and 200° C. for 1 to 24 hours,
wherein the pre-reforming catalyst comprises Ru between 0.1 and 1.0 percent by weight (wt %) and Ag between 0.1 and 0.5% w/w deposited on the theta-alumina support, based upon the weight of the pre-reforming catalyst,
wherein
the theta-alumina support is impregnated by a pore volume technique or by the excess solution method using incipient wetness impregnation method; and
the pre-reforming catalyst has resistance to deactivation by passage of steam in the absence of a reducing agent.

9. The pre-reforming catalyst according to claim 8, wherein the Ru comprises between 0.1 and 0.5 wt %, based upon the weight of the pre-reforming catalyst.

10. The pre-reforming catalyst according to claim 8, wherein a total surface area of the pre-reforming catalyst is between 60 square meters per gram ($m^2/g$) and 120 $m^2/g$.

11. A pre-reforming process comprising:
reacting hydrocarbons with steam at temperatures between 400 and 550° C. to produce a product stream comprising hydrogen and having a methane content above 20 percentage by weight (wt %), based upon the weight of the product stream, wherein the pre-reforming is carried out in the presence of the pre-reforming catalyst of claim 10 and in the absence of a reducing agent.

* * * * *